United States Patent
Canac et al.

(10) Patent No.: US 6,805,740 B2
(45) Date of Patent: Oct. 19, 2004

(54) PHOSPHOMAGNESIUM MORTAR AND METHOD FOR OBTAINING SAME

(75) Inventors: Cyrille Canac, Rungis (FR); Nathalie Riche, Eaubonne (FR); Gilles Orange, Soisy sous Montmorency (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 10/296,790

(22) PCT Filed: May 22, 2001

(86) PCT No.: PCT/FR01/01579
§ 371 (c)(1),
(2), (4) Date: Nov. 26, 2002

(87) PCT Pub. No.: WO01/92181
PCT Pub. Date: Dec. 6, 2001

(65) Prior Publication Data
US 2003/0140821 A1 Jul. 31, 2003

(30) Foreign Application Priority Data
May 29, 2000 (FR) .............................. 00 06836

(51) Int. Cl.⁷ .......................... C04B 28/34; C04B 40/00
(52) U.S. Cl. ...................... 106/690; 106/691
(58) Field of Search .................. 106/690, 691

(56) References Cited

U.S. PATENT DOCUMENTS

| 4,394,174 | A | * | 7/1983 | Tomic | 106/691 |
| 5,322,389 | A |   | 6/1994 | Smith | 405/128 |
| 5,518,541 | A | * | 5/1996 | Fogel et al. | 106/691 |
| 5,595,597 | A | * | 1/1997 | Fogel et al. | 106/691 |
| 5,718,757 | A | * | 2/1998 | Guillou et al. | 106/691 |
| 6,153,673 | A | * | 11/2000 | Lemos et al. | 524/5 |
| 2003/0127025 | A1 | * | 7/2003 | Orange et al. | 106/690 |

FOREIGN PATENT DOCUMENTS

| DE | 196 05 701 | 9/1997 | ............. C04B/2/06 |
| EP | 0 262 981 | 4/1988 | ........... C04B/28/02 |
| EP | 0 275 609 | 7/1988 | ........... C04B/28/34 |
| EP | 0 661 242 | 7/1995 | ........... C04B/28/34 |
| FR | 2 764 285 | 12/1998 | ............. C04B/9/04 |

OTHER PUBLICATIONS

International Search Report (Sep. 14, 2001).

* cited by examiner

*Primary Examiner*—Anthony J. Green

(57) ABSTRACT

The invention concerns a novel phosphomagnesium mortar and the method for obtaining such a mortar. The mortar is a phosphomagnesium mortar comprising a phosphomagnesium binder containing a phosphorus compound and a magnesium compound, granular elements, and water in a E/L ratio less than 0.38, E representing the amount of water and L the amount of magnesium compound, and whereof the fluidity is at least 150%.

11 Claims, No Drawings

PHOSPHOMAGNESIUM MORTAR AND METHOD FOR OBTAINING SAME

This application is an application under 35 U.S.C. Section 371 of International Application Number PCT/FR01/01579 filed on May 22, 2001.

The invention relates to a novel phosphomagnesium mortar, to a process for obtaining this mortar and to the hydraulic binder of use in obtaining the mortar.

Phosphomagnesium cements are hydraulic binders, that is to say binders which solidify in the presence of water. They are characterized by a binder based on phosphorus and magnesium derivatives.

The phosphomagnesium mortars obtained from these cements are particularly advantageous for their speed of setting and their good mechanical properties. In addition, they can be used in contact with aggressive media. However, this very rapid setting, which is advantageous in some applications, such as the repair of an airport runway or a road, limit the use of these phosphomagnesium mortars.

These mortars are provided in the form of a thick paste which renders them not very compatible with applications such as the manufacture of a floor slab or prefabricated components, unless large amounts of water or of fluidizing agents are added to them. When fluidizing agents are added, the setting time is generally affected detrimentally. When the amount of water is increased in order to render the mortar fluid, the mechanical properties generally deteriorate.

Furthermore, the articles obtained from phosphomagnesium mortars exhibit in particular a weak flexural strength. Phosphomagnesium mortars are generally brittle and lack flexibility. This is a disadvantage when, for example, the mortar is used to cover a support which, subjected to various stresses, moves and undergoes deformations. If the coating based on phosphomagnesium mortar lacks flexibility, it cracks or splits.

The aim of the present invention is to provide a novel family of fluid and selfleveling phosphomagnesium mortars which exhibit short setting times and which develop excellent mechanical properties over time.

These aims are achieved in the present invention, which relates to a fluid and selfleveling phosphomagnesium mortar which comprises a phosphomagnesium binder comprising a phosphorus compound and a magnesium compound, granular components and water, in which the W/B ratio is less than 0.38, W representing the amount of water and B the amount of phosphorus compounds and magnesium compound in the mortar, and the fluidity of the mortar is at least 150%.

Another subject matter of the invention is a process for the preparation of a fluid and selfleveling phosphomagnesium mortar which comprises the addition of water to a mixture comprising a phosphomagnesium binder, comprising a phosphorus compound and a magnesium compound, and granular components, the amount of water added being such that the W/B ratio is less than 0.38, and the kneading of the mixture to which water has been added under conditions such that the energy supplied to the mixture is sufficient to allow the liquefaction point of the paste to be passed to form a mortar which exhibits a fluidity of at least 150%.

Finally, a subject matter of the invention is articles obtained from the mortar according to the invention which exhibit a compressive mechanical strength at 24 hours of at least 30 MPa.

In the context of the invention, the fluidity is measured from a metal cylinder with a diameter (di) of 3 cm and with a height of 4.8 cm placed on a plastic film. In a first step, the cylinder is filled with the mortar for which it is desired to measure the fluidity, the cylinder is immediately removed and the diameter (df) of the cake obtained is measured 2 minutes after having removed the cylinder. The fluidity according to the invention is defined in % according to the formula (df/di)×100.

During the mixing of the phosphomagnesium binder, granular components and water under the conditions defined above, a nonfluid thick paste is formed first. It has been found, surprisingly, that applying intensive kneading to this paste, the paste converted into a mortar with a fluidity of at least 150%. The term "intensive kneading" is understood to mean kneading which is carried out with sufficient energy to allow the liquefaction point of the paste to be passed, that is to say the instantaneous change from a pasty state to a fluid state. The formation of a thick paste is first observed, which paste is instantaneously converted into a fluid mortar after passing the liquefaction point. This fluidity is obtained solely by the use of the kneading stage, without supplementary addition of water or of fluidizing agent.

The mortar of the present invention which exhibits a fluidity of at least 150% makes it possible to produce, for example, floor coatings. Because of its fluidity, it also makes it possible for the manufacture of prefabricated components by the use of suitable mold. It can also be pumped and sprayed without difficulty.

The fluid mortar of the present invention is obtained with low amounts of water which makes it possible to obtain articles exhibiting good mechanical properties, in particular a high compressive strength, at early ages.

Furthermore, this mortar, when it does not comprise set retarder, exhibits a very rapid setting time.

Conventionally, a phosphomagnesium binder comprises at least one phosphorus compound and at least one magnesium compound. As regards the phosphorus compound, any phosphorus-based compound can be used insofar as it comprises phosphorus pentoxide, available directly or in the form of a precursor.

Thus, mention may be made, as phosphorus compound, without the intention of being limiting, of phosphorus pentoxide, phosphoric acid or derivatives, such as orthophosphoric acid, pyrophosphoric acid or polyphosphoric acid, or the salts of such acids, such as aluminum, calcium, potassium, magnesium or ammonium phosphates, hydrogenphosphates, orthophosphates, pyrophosphates, polyphosphates, tripolyphosphates or tetrapolyphosphates, or their mixtures.

It should be noted that phosphorus-comprising waste from the fertilizer-manufacturing industries or from steelworks (pickling of steel, treatment to reduce corrosion) can be employed as phosphorus-based constituents.

According to a specific embodiment of the invention, the salts of the phosphorus-based acids mentioned above are used.

Preferably, potassium, magnesium or ammonium phosphates or hydrogenphosphates or their mixtures are used. In an even more preferred way, the phosphorus-based constituent is ammonium dihydrogenphosphate, optionally mixed with ammonium tripolyphosphate.

The phosphorus compound can be provided in a liquid form or, preferably, in a solid form.

According to a first alternative form, the phosphorus compound is in the form of particles with a particle size more particularly of at most 300 $\mu$m. It should be noted that this value is not critical and that, while it is possible to use constituents with a particle size of greater then 300 $\mu$m, milling before incorporation in the composition according to the invention may be desirable. This milling can improve the kinetics of dissolution of the phosphorus compound.

According to a second alternative form, the compound is used in a form adsorbed on a porous support. Mention may be made, as support, for example, of diatomaceous earths, clay, bentonite, silica or alumina. Adsorption is carried out in a way known per se. Thus, conventionally, the phosphorus compound, in solution or in suspension, is brought into contact with the support, with stirring, and then the resulting suspension is heated in order to evaporate off the excess liquid. This operation can likewise be carried out by impregnation of the support in a drum or on a rotating disk.

The phosphomagnesium binder also comprises at least one magnesium compound.

Any magnesium-based compound is suitable for the present invention insofar as it reacts with the phosphorus compound in the presence of water.

Mention may be made, by way of example, as suitable for the implementation of the invention, of the following magnesium compounds: magnesium oxide, magnesium hydroxide or magnesium carbonate.

Preferably, a compound based on magnesium oxide is used. "Dead burned" magnesia, usually obtained after calcination of magnesium carbonate, at temperatures of greater than 1200° C., is suitable in particular.

Advantageously, said magnesium oxide can be employed in a pure form or can optionally comprise at least one element of the calcium, silicon, aluminum or iron type; these elements generally being in the oxide or hydroxide form. Mention may be made, as example of this type of compound, of dolomite, a mixture comprising in particular magnesium oxide and calcium oxide.

If the magnesium oxide is used in the pure form, the purity of said oxide is at least 80%.

Use is preferably made of a magnesium compound with a specific surface area of less than 10 $m^2/g$. More particularly, the specific surface area is less than 2 $m^2/g$.

Furthermore, the particle size of said compound is usually between 10 and 500 µm. It would be possible to envisage the use of compounds with a particle size outside the abovementioned range but without this introducing specific advantages. Thus, if the particle size is greater than 500 µm, a milling stage prior to the incorporation in the composition may be necessary. Furthermore, if the particle size of said compounds were smaller than 10 µm, the properties of the composition brought into contact with water might be found to be modified. An increase in the rate of setting of the cement may in particular be observed, unless the content of set retarder is increased, which will be discussed in the continuation of the description. For this reason, the mortar according to the invention might be less advantageous from the viewpoint of use or from the economic viewpoint.

In the phosphomagnesium binder, the proportion of the magnesium compound (expressed as weight of MgO) with respect to that of the phosphorus compound (expressed as weight of $P_2O_5$) in the phospho-magnesium binder is more particularly between 1 and 4.

According to the invention, the water comprises granular components. These granular components can be chosen from sand, $SiO_2$, $TiO_2$, $Al_2O_3$, $ZrO_2$, $Cr_2O_3$, talc, mica, kaolin, bentonite, metakaolin, raw dolomite, chromium ore, clinker, vermiculite, perlite, mica, cellulose or slag. They can be synthetic products. This can be crystalline or amorphous compounds obtained, for example, by milling and sieving to the desired size. Milled silica, pyrogenic silica or fly ash can also be used. According to one embodiment, the granular components comprise fly ash in an amount of between 1 and 20% with respect to the weight of the granular components.

According to one embodiment, the granular components are composed predominantly of siliceous sand.

The particle size distribution of the granular components can vary widely according to the application envisaged. The size of the granular components can vary, for example, between 1 and 500 µm.

The mortar of the invention comprises an amount of phosphomagnesium binder of between 10 and 50% by weight with respect to the total amount of mortar, excluding water.

According to one embodiment, the stack of granules is such that the granular components comprise at least one inorganic powder with a D50 of greater than 100 µm, preferably of between 200 and 400 µm, and at least one inorganic powder with a D50 of less than 50 µm, preferably of between 1 and 10 µm.

In particular, the powder with a D50 of less than 50 µm, preferably of between 1 and 10 µm, represents at least 15% by weight of the granular components and the inorganic powder with a D50 of greater than 100 µm represents at most 75% of the granular components, preferably at most 70%.

D50 means that 50% by weight of the granular components have a grain size of less than or equal to the given value, the grain size being measured by the mesh size of the sieves for which the material passing through constitutes 50% of the total weight of the grains.

The amount of water in the mortar, which is defined from the W/B ratio, is preferably between 0.28 and 0.33.

The mortar according to the invention can comprise a set retarder. More particularly, this retarder is chosen from compounds capable of completing the magnesium. The latter can in particular be carboxylic acids, such as citric acid, oxalic acid or tartaric acid, boron-comprising acids, esters or salts, phosphorus-comprising acids, esters or salts, such as sodium tripolyphosphate, ferrous sulfate, sodium sulfate and lignosulfonate, zinc chloride, copper acetate, sodium gluconate, sodium cellulose acetate sulfate, the product of the reaction of formaldehyde with aminolignosulfate, dialdehyde starch, N,N-dimethyloldihydroxyethyleneurea, silicofluorides, tall oil and sucrose, these compounds being taken alone or as a mixture.

Use is preferably made, alone or as a mixture, of carboxylic acids and preferably of boron-comprising acids, esters or salts.

Thus, in this latter category of compounds, mention may be made, without the intention of being limiting, of boric acid and its salts, such as salts of alkali metals, for example sodium (borax), or amine or ammonium salts. Boric acid esters are also suitable for the implementation of the invention, such as trialkyloxy borates or triaryloxy borates.

According to a specific form, the set retarder is employed in the form of a powder with a mean diameter of from 10 to 200 µm.

The amount of set retarder is at most 10% by weight with respect to the weight of binder. Preferably, this amount is at most 5%.

According to the present invention, the mortar can comprise fibers. Mention may be made, as example of fibers of use in the context of the invention, of fibers made of polypropylene, of polyester or of polyaramide, such as, for example, Kevlar®, carbon fibers, polyamide, poly(vinyl alcohol), cellulose fibers or amorphous cast iron tapes.

Glass fibers can likewise be used. Any glass fiber commonly employed in cements is suitable. Use may therefore be made of alkali-resistant fibers, such as the special glass fibers obtained in particular by treatment with zirconium, as well as soda-lime glass fibers. However, advantageously, standard glass fibers are also suitable. This is the case with conventional glasses, such as borosilicate glasses, which are usually destroyed in an alkaline medium.

According to a preferred embodiment, the fibers are organic fibers. Mention may be made, for example, of polypropylene or polyamide fibers.

These fibers have lengths varying from 0.6 mm to several tens of millimeters, preferably from 1 to 15 mm. The fibers have a diameter of between 1 and 50 $\mu$m, preferably of between 5 and 25 $\mu$m. The amount of fibers in the mortar of the invention is between 0.1 and 10% with respect to the weight of binder, preferably between 0.1 and 2%.

The fluidity of the mortar of the invention makes possible the addition of fibers, preferably organic fibers. When the mortar comprises such fibers, the ductility of the articles produced from this binder is increased, without harming the rheological properties of the fresh mortar.

Furthermore, the mortar according to the invention can comprise n agent imparting water repellency.

Finally, the mortar of the invention can comprise any conventional additive, such as latex powders, antifoaming agents, for example antifoaming agents based on polydimethylsiloxane and polypropylene glycol, or texture and viscosity agents, for example cellulose, guar, starch, cellulose ether, starch ether or poly(vinyl alcohol) fibers.

Generally, the amount of these additives in the mortar is at most 10% by weight with respect to the binder. Preferably, the amount of additives is at most 5%.

In the process of the present invention, the fluid mortar is obtained by kneading the constituents of the mortar, to which water has been added, with sufficient energy to allow the liquefaction point to be passed. During kneading, a very thick paste is first formed, which paste, after kneading for a sufficient time, instantaneously fluidizes to form the fluid mortar (fluidity of at least 150%).

The kneading of the mixture and of the water is carried out according to any appropriate method, the important point being to obtain a distribution which is as homogeneous as possible of all the constituent components of the mortar and the conversion of the thick paste into a fluid mortar by exceeding the liquefaction point.

According to one embodiment, the kneading is carried out under shear conditions, using a kneader which can provide a power of at least 50 W/kg of mortar for a time sufficient to allow the conversion of the thick paste into a fluid mortar. According to one embodiment, the kneading time is at most 15 minutes, preferably between 5 and 10 minutes. The kneading time must be as short as possible, in particular because of the rapid setting of the mortar (low open time). If it is desired to reduce the kneading time, it is also possible to exceed the liquefaction point by kneading the mixture with greater energy, for example greater than 100 W/kg of mortar.

The operation can be carried out by introducing the binder, the granular components, the optional additives and the water, simultaneously or separately. According to this latter possibility, a composition comprising all the solid components used in the composition of the mortar is generally prepared. Water, which may comprise other liquid additives of use in the preparation of the mortar, is subsequently added to this composition. However, it is preferable to have all the components in the solid form mixed in a single premix in order merely to have to add only water during the kneading. In order to improve the homogeneity of the mixture, it is also possible to carry out a stage of preliminary mixing of the solid components before adding water.

The mixing operation is advantageously carried out at a temperature in the region of ambient temperature.

With the fluid mortar of the present invention, articles are surprisingly obtained from a phosphomagnesium binder having good mechanical properties. Test specimens with dimensions of 4×4×16 cm prepared from the mortar of the present invention exhibit a compressive strength of greater than 30 MPa in 24 h.

The fluid mortar thus obtained can be poured without difficulty onto the ground. Its selfleveling property makes it possible to obtain perfectly smooth and resistant coatings. This fluid mortar can also be cast in an appropriate mold, to give prefabricated articles, for example slabs, panels, stairs, and the like. The molded products are subsequently dried, advantageously at a temperature in the region of ambient temperature. Due to the time for acquiring the mechanical properties at early ages, articles which are mechanically very strong are obtained in a shorter period of time, which makes it possible to greatly accelerate the manufacturing production rates.

It is possible to use them as mortars for repairing and sealing, for example in the quick repairing of roads, bridges and airport runways. Thus, they are used to fill in cracks or holes or to cover damaged areas, as well as for the repair of reinforced concrete structures. This is because these mortars, in addition to good adhesion to "Portland" cements, exhibit good mechanical properties of flexural and compressive strength, rendering them particularly suitable for applications of this type.

It is also possible to employ these mortars as pipework linings as they are resistant to chemical attacks and exhibit excellent hardness and resistance to abrasion.

The mortar of the invention does not exhibit any demixing phenomenon either.

The following examples illustrate the invention without, however, limiting the scope thereof.

EXAMPLES

Measurement of the Mechanical Properties

Prism-shaped test specimens (4×4×16 cm) are prepared by casting the mortar in standard polystyrene molds.

After removing from the molds, the mechanical properties of the test specimens are measured under the following conditions.

The measurements are carried out in three-point bending (NFP 18407) on six test specimens and in compression (NFP 15451) on six test specimens using a hydraulic testing device (200 kN).

Example 1

A phosphomagnesium mortar is prepared from the following hydraulic binder (parts by weight):

589 parts by weight of a mixture of monoammonium phosphate and of magnesium oxide (50/50 by weight), 28 parts of boric acid (set retarder), 55 parts of silica, sold by Rhodia under the name Tixosil 43 (D50=10.5 $\mu$m), 1025 parts of silica sand, CV 32 grade, sold by Sifraco with a D50=246 $\mu$m, 170 parts of milled silica, Millisil C10 grade, sold by Sifraco with a D50=17.2 $\mu$m 320 parts of milled silica, Sikron C600 grade, sold by Sifraco with a D50=2.4 $\mu$m, 0.7 part of polyamide fibers with a length of 4 mm.

The mortar is prepared by addition of various amounts of water specified in the following table 1.

The constituents described above are first mixed in the dry state in order to obtain a homogeneous mixture and then water is added in the proportion specified in table 1 below.

The kneading of the mixture, to which water has been added, is carried out with a kneader of MaxLab5 type sold by Cesa, which supplies energy of approximately 70 W/kg of mortar. In all the following examples, the kneading is carried out for 8 min at 180 rev/min. These kneading conditions make it possible to exceed the liquefaction point of the mixture and to obtain a fluid mortar.

Test specimens are prepared from this paste according to the procedure described above. The setting time is of the order of 35 min. The mechanical properties obtained are reported in table 1.

TABLE 1

|  | Ex. 1.1 | Ex. 1.2 | Ex. 1.3 | Ex. 1.4 |
|---|---|---|---|---|
| W/B | 0.29 | 0.31 | 0.33 | 0.38 |
| Flexural strength, MPa, at 24 hours | 9.9 | 8.7 | 8.0 | 6.0 |
| Compressive strength at 24 hours (MPa) | 45.4 | 36.1 | 32.9 | 24.9 |
| Passage of the liquefaction point (min) | 4.75 | 4 | 3 | 2 |
| Fluidity % | 150 | 200 | 233 | 253 |

Example 1.4 shows that, when the ratio W/B is 0.38, a fluid mixture is indeed obtained; however, the compressive strength at 24 hours is less than 30 MPa. Examples 1.1 to 1.3 show that it is possible to obtain a fluid mortar while reducing the amount of water present in the mortar by applying a kneading to the mixture which makes it possible to exceed the liquefaction point. For a ratio of W/B as low as 0.29, a fluid mortar is thus obtained while retaining good properties at early ages.

When the kneading of the mortars which is described above is halted before the liquefaction point has been passed, the mortars obtained exist in the form of a nonfluid paste. The fluidity can only be obtained by addition of a supplementary amount of water, which greatly damages the mechanical properties at early ages.

Example 2

Example 1 is repeated starting from a mixture comprising:
589 parts by weight of a mixture of monoammonium phosphate and of magnesium oxide (50/50 by weight),
28 parts of boric acid (set retarder),
53 parts of silica, sold by Rhodia under the name Tixosil 43 (D50=10.5 $\mu$m),
1000 parts of silica sand, CV 32 grade, sold by Sifraco with a D50=246 $\mu$m,
180 parts of milled silica, Millisil C10 grade, sold by Sifraco with a D50=17.2 $\mu$m
180 parts of milled silica, Sikron C600 grade, sold by Sifraco with a D50=2.4 $\mu$m,
160 parts of Silicoline (fly ash), sold by Surschiste,
2 parts of yellow dye J920 (Bayer).

The mortar is prepared by addition of water in an amount such that W/B is 0.3.

The kneading of the mixture, to which water has been added, is carried out with a kneader of MaxLab5 type sold by Cesa, which supplies energy of approximately 70 W/kg of mortar, under kneading conditions which make it possible to exceed the liquefaction point of the mixture (8 min at 185 rev/min) and to obtain a fluid mortar (fluidity of at least 150%). The compressive strength obtained is 50 MPa at 48 hours and the flexural strength is 8 MPa at 48 hours.

What is claimed is:

1. A phosphomagnesium mortar comprising a phosphomagnesium binder, which comprises a phosphorus compound and an amount of magnesium compound, granules and an amount of water, having a W/B ratio less than 0.38, W representing the amount of water and B the amount of magnesium compound and phosphorus compound, and a fluidity of said mortar of at least 150%.

2. The phosphomagnesium mortar as claimed in claim 1, further comprising a set retarder.

3. The mortar as claimed in claim 1, further comprising organic fibers with a diameter of between 1 and 50 $\mu$m.

4. The mortar as claimed in claim 1, wherein the amount of phosphomagnesium binder is between 10 and 50% by weight with respect to the total amount of mortar, excluding water.

5. The mortar as claimed in claim 1, wherein the granules comprise siliceous sands.

6. The mortar as claimed in claim 1, wherein the W/B ratio is between 0.28 and 0.33.

7. The mortar as claimed in claim 1, wherein the granules are formed of at least one inorganic powder with a D50 of greater than 100 $\mu$m and at least one inorganic powder with a D50 of less than 50 $\mu$m.

8. The mortar as claimed in claim 7, wherein the powder with a D50 of less than 50 $\mu$m represents at least 15% by weight of the granules and the inorganic powder with a D50 of greater than 100 $\mu$m represents at most 75% of the granules.

9. A process for the preparation of the phosphomagnesium mortar as defined in claim 1, comprising the steps of:
   a) adding water to a mixture comprising a phosphorus compound and a magnesium compound and granules, the amount of water added being such that the W/B ratio is less than 0.38, and
   b) kneading of the mixture to which water has been added under conditions which allow the mixture of step a) to pass its liquefaction point.

10. The process as claimed in claim 9, wherein, in step b), the kneading is carried out with a power of at least 50 W/kg of mortar for a time sufficient to allow the liquefaction point to be passed.

11. An article of manufacture obtained from the mortar as defined in claim 1, exhibiting a compressive mechanical strength at 24 hours of at least 30 MPa.

* * * * *